(12) United States Patent
Xiang et al.

(10) Patent No.: US 10,743,185 B2
(45) Date of Patent: Aug. 11, 2020

(54) DATA TRANSMISSION METHOD AND APPARATUS

(71) Applicant: HUAWEI TECHNOLOGIES CO., LTD., Shenzhen, Guangdong (CN)

(72) Inventors: Zhengzheng Xiang, Shanghai (CN); Jiyong Pang, Shanghai (CN); Jun Zhu, Shanghai (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 16/031,700

(22) Filed: Jul. 10, 2018

(65) Prior Publication Data

US 2018/0324596 A1 Nov. 8, 2018

Related U.S. Application Data

(63) Continuation of application No. PCT/CN2017/070657, filed on Jan. 9, 2017.

(30) Foreign Application Priority Data

Jan. 11, 2016 (CN) .......................... 2016 1 0016725

(51) Int. Cl.
*H04L 12/28* (2006.01)
*H04W 16/10* (2009.01)
*H04W 74/08* (2009.01)
*H04W 72/04* (2009.01)
*H04W 72/08* (2009.01)
*H04W 74/00* (2009.01)

(52) U.S. Cl.
CPC .......... *H04W 16/10* (2013.01); *H04W 72/04* (2013.01); *H04W 72/046* (2013.01); *H04W 72/0426* (2013.01); *H04W 72/082* (2013.01); *H04W 74/006* (2013.01); *H04W 74/0816* (2013.01)

(58) Field of Classification Search
CPC ....................................................... H04L 12/28
USPC ......................................................... 370/329
See application file for complete search history.

(56) References Cited

U.S. PATENT DOCUMENTS

| | | |
|---|---|---|
| 2012/0327870 A1 | 12/2012 | Grandhi et al. |
| 2014/0286203 A1 | 9/2014 | Jindal et al. |
| 2014/0328268 A1 | 11/2014 | Zhu et al. |

(Continued)

FOREIGN PATENT DOCUMENTS

| | | |
|---|---|---|
| CN | 104066091 A | 9/2014 |
| CN | 104284441 A | 1/2015 |

(Continued)

*Primary Examiner* — Dang T Ton
(74) *Attorney, Agent, or Firm* — Womble Bond Dickinson (US) LLP (57) ABSTRACT

Embodiments of the present invention provide a data transmission method and an apparatus. In the method, a communications node receives N spatial reuse parameters SRPs; the communications node determines, based on the received N SRPs, that the communications node can perform spatial reuse link transmission; and the communications node transmits data by using a spatial reuse link, and processes data transmission based on the spatial reuse link. Whether spatial reuse link transmission can be performed is determined based on the received SRPs, so as to reduce mutual interference between a primary link and the spatial reuse link during data transmission, and improve transmission quality.

8 Claims, 3 Drawing Sheets

(56) References Cited

U.S. PATENT DOCUMENTS

| | | |
|---|---|---|
| 2016/0174206 A1 | 6/2016 | Xia et al. |
| 2016/0174262 A1 | 6/2016 | Xing et al. |
| 2019/0053062 A1* | 2/2019 | Wang .................... H04W 16/14 |

FOREIGN PATENT DOCUMENTS

| | | | |
|---|---|---|---|
| CN | 105230110 A | 1/2016 | |
| GB | 2510411 A | 8/2014 | |
| WO | 2014/074071 A1 | 5/2014 | |
| WO | 2014110397 A1 | 7/2014 | |
| WO | 2014190290 A1 | 11/2014 | |
| WO | WO-2014190290 A1 * | 11/2014 | ........ H04W 74/0816 |
| WO | 2015/006537 A3 | 3/2015 | |
| WO | 2015/042019 A1 | 3/2015 | |
| WO | 2015112780 A1 | 7/2015 | |
| WO | 2015/147874 A1 | 10/2015 | |

* cited by examiner

DATA TRANSMISSION METHOD AND APPARATUS

CROSS-REFERENCE TO RELATED APPLICATIONS

This application is a continuation of International Patent Application PCT/CN2017/070657, filed on Jan. 9, 2017, which claims priority to Chinese Patent Application No. 201610016725.9, filed on Jan. 11, 2016, the disclosure of which are incorporated herein by references in their entireties.

TECHNICAL FIELD

Embodiments of the present invention relate to the communications field, and more specifically, to a data transmission method and an apparatus.

BACKGROUND

In some networks, for example, in a wireless local area network (WLAN), to avoid interference caused by a collision during data transmission, a carrier sense multiple access with collision avoidance (CSMA/CA) channel access mechanism is used. According to the CSMA/CA mechanism, when a station (STA) or an access point (AP) senses that a strength of a Wi-Fi signal on a channel is greater than −82 dBm or senses that a strength of any non-Wi-Fi signal on the channel is greater than −62 dBm, the STA or the AP determines that the current channel is in a busy state and sends no signal to avoid a collision. The industry considers that in a broad sense, a STA includes an AP and a non-AP STA, and that in a narrow sense, a STA means a non-AP STA. If a STA does not specifically mean an AP, a collective term STA or station is usually used. If a STA may mean an AP, terms AP and non-AP STA are used for distinguishing. In this specification, a non-AP STA may be referred to as a STA.

Figure 1:
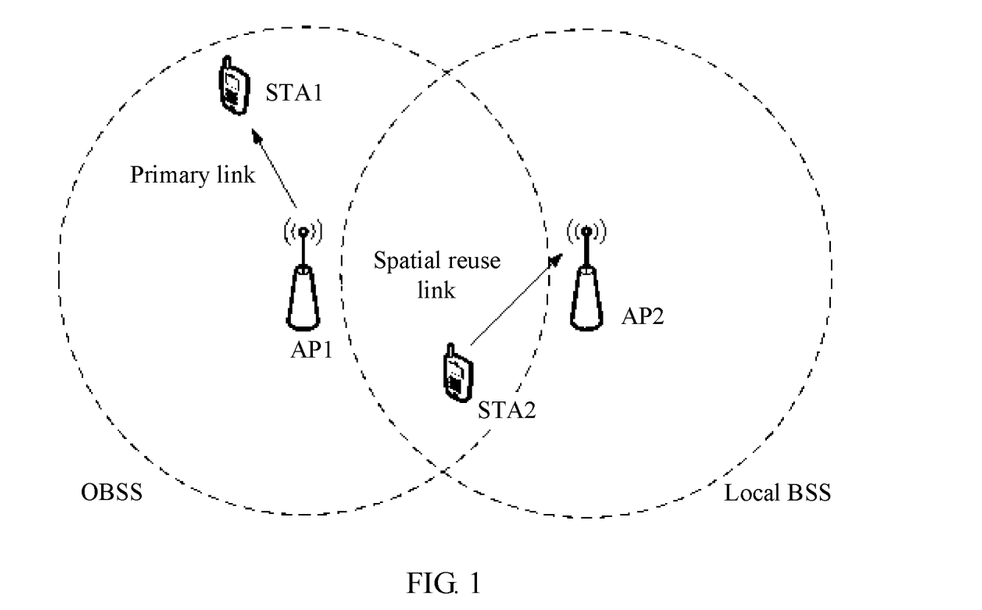
FIG. 1 is a schematic diagram of a communications system to which a data transmission method according to an embodiment of the present invention is applicable.

With development of communications technologies, a concept of spatial reuse (SR) is introduced to increase a system throughput in a high-density scenario. In a specific scenario or under a specific condition, two or more stations or APs are allowed to use time-frequency resources that are the same or partially same (it may be simply understood as using a same channel within a same time period) for transmission. It may be understood as follows: When a local basic service set (BSS) station or AP senses that there is a signal from an overlapping basis service set (OBSS) on a current channel, if a strength of the signal is greater than −82 dBm but less than an OBSS packet detection level (OBSS PD), an OBSS clear channel assessment (OBSS CCA) value, or a spatial reuse clear channel assessment (SR CCA) value, the local BSS station or AP may use a same channel through a specific means (for example, adjusting a transmit power) under a specific condition (for example, ongoing OBSS communication is not affected) to perform spatial reuse link transmission. Generally, the OBSS PD level needs to be greater than −82 dBm and less than −62 dBm. For example, as shown in FIG. 1, at the same time when an access point AP1 sends downlink data to a STA1 (a link between the AP1 and the STA1 may be referred to as a primary link), a STA2 uses all or some of time-frequency resources of the primary link to transmit uplink data to an access point AP2 (a link between the AP2 and the STA2 may be referred to as a spatial reuse link). The primary link and the spatial reuse link are relative concepts. An intersection of transmission time exists between the primary link and the spatial reuse link, or a transmission time of the spatial reuse link is a part of a transmission time of the primary link. For another link B that starts data transmission within a transmission time of a link A, if a transmit end station of the link B is within an effective communication distance between a transmit end station and a receive end station of the link A, and the link B uses all or some of time-frequency resources of the link A, the link A is referred to as the primary link of the link B, and correspondingly, the link B is the spatial reuse link of the link A. Generally, the primary link may be an uplink transmission link (that is, a transmission link from a STA to an AP), or may be a downlink transmission link (that is, a transmission link from an AP to a STA). FIG. 1 is a scenario in which the primary link is a downlink transmission link. The spatial reuse link may also be an uplink transmission link or a downlink transmission link. In FIG. 1, the spatial reuse link being an uplink transmission link is used as an example for demonstration, and the spatial reuse link is usually located in a BSS different from that of the primary link. Data packets of different BSSs usually carry different BSS identities. A BSS identity may be a BSS color located in a preamble signaling field of a data packet physical layer protocol data unit (PPDU), may be a BSS identifier (BSSID) in an address field in a MAC frame header carried in the PPDU, or may be presented in another form. A BSS from which the data packet is may be known by identifying the BSS identity.

At present, an effective determining mechanism for using the spatial reuse link is required, to reduce interference between the primary link and the spatial reuse link and improve transmission quality.

SUMMARY

The present invention provides a data transmission method and an apparatus, to reduce mutual interference between a primary link and a spatial reuse link during data transmission and improve transmission quality.

According to a first aspect, a data transmission method is provided. The method includes:

receiving, by a communications node, N spatial reuse parameters (SRPs);

determining, by the communications node based on the received N SRPs, that the communications node can perform spatial reuse link transmission; and transmitting, by the communications node, data by using a spatial reuse link.

According to a second aspect, a communications node is provided, including:

a receiver, configured to receive N SRPs; and a processor, configured to determine, based on the received N SRPs, that the communications node can perform spatial reuse link transmission, and the communications node transmits data by using a spatial reuse link.

Based on the foregoing technical solutions, according to the data transmission method and the apparatus in the embodiments of the present invention, the communications node receives the N spatial reuse parameters SRPs; the communications node determines, based on the received N SRPs, that the communications node can perform spatial reuse link transmission; and the communications node transmits data by using the spatial reuse link. Whether spatial reuse link transmission can be performed is determined based on the received SRPs, so as to reduce mutual interference between the primary link and the spatial reuse link during data transmission, and improve transmission quality.

BRIEF DESCRIPTION OF DRAWINGS

To describe the technical solutions in the embodiments of the present invention more clearly, the following briefly describes the accompanying drawings required for describing the embodiments of the present invention. The accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. The described embodiments are some but not all of the embodiments of the present invention. All other embodiments obtained by a person of ordinary skill in the art based on the embodiments of the present invention without creative efforts shall fall within the protection scope of the present invention.

The technical solutions of the present invention may be applied to various data transmission communications systems including a primary link and a spatial reuse link, for example, a wireless local area network (WLAN) system, and a Wireless Fidelity (Wi-Fi) system represented by 802.11a, 802.11b, 802.11g, 802.11n, and 802.11ac, or may be applied to a next generation Wi-Fi system, a next generation wireless local area network system, or the like.

Correspondingly, a STA may be referred to as a system, a subscriber unit, an access terminal, a mobile station, a remote station, a remote terminal, a user terminal, a terminal, a wireless communications station, a user agent, a user apparatus, or user equipment (UE). The STA may be a cellular phone, a cordless phone, a Session Initiation Protocol (SIP) phone, a wireless local loop (WLL) station, a personal digital assistant (PDA), a handheld station having a wireless local area network (for example, Wi-Fi) communication function, a computing station, or another processing station connected to a wireless modem.

In addition, an AP in the WLAN may be configured to communicate with a STA by using the wireless local area network, and transmit data of the STA to a network side or transmit data from the network side to the STA.

For ease of understanding and description, by way of example and not by way of limitation, the following describes a data transmission method and execution processes and actions of an apparatus in the WLAN system in the present invention.

FIG. 1 is a schematic diagram of a simple application scenario in an embodiment of the present invention.

It should be understood that, in this embodiment of the present invention, the application scenario in FIG. 1 is used as an example for description, but this embodiment of the present invention is not limited thereto. For example, a local BSS (that is, a BSS on which an AP2 and a STA2 reside, marked as a BSS2) and an OBSS (a BSS on which an AP1 and a STA1 reside, marked as a BSS1) in FIG. 1 may include more stations. In addition, there may be more than one OBSS around the local BSS. In other words, in addition to the OBSS provided in the figure, there may be another OBSS. In FIG. 1, it is assumed that a link between the AP1 and the STA1 is a primary link relative to a link between the AP2 and the STA2, and a power of a signal, sensed by the AP2 or the STA2, of the primary link between the AP1 and the STA1 may be greater than a threshold, for example, −82 dBm. As previously described, there may be more than one OBSS around the local BSS. Therefore, the AP2 or the STA2 can sense more than one primary link relative to the link between the AP2 and the STA2. Moreover, a transmission direction of a link in FIG. 1 is not limited to a direction shown in the figure, but may be an uplink or a downlink direction. In other words, the primary link may be an uplink or a downlink, and a spatial reuse link may be an uplink or a downlink. It may also be simply understood as follows: If all powers of signals sensed by a link sending device before sending a PPDU are not less than a threshold, a link corresponding to the sent PPDU is a spatial reuse link. For example, if the signals are Wi-Fi signals, all the powers of the signals are not less than −82 dBm; or if the signals are non-Wi-Fi signals, all the powers of the signals are not less than −62 dB. The industry may have different understandings of the primary link and the spatial reuse link. All the understandings are included in the protection scope of the present invention.

To ensure that signal transmission of the primary link is not interfered with by a signal on the spatial reuse link, a transmit end of the primary link or a transmit end of the spatial reuse link (for uplink transmission, the transmit end is a STA; or for downlink transmission, the transmit end is an AP) adds spatial reuse parameter (SRP) information to a signal sent by the transmit end. The SRP may be a simple concurrency enabling/disabling function indication. For example, one bit, a plurality of bits, or a special value is used to represent whether to allow another STA or AP and a link carrying the SRP to perform concurrent transmission. Concurrent transmission may alternatively be understood as spatial reuse link transmission. Alternatively, the SRP may represent a value of an interference level (interference level) that can be tolerated by the primary link. For example, the SRP being a value representing −74 dBm means that a signal strength of interference of the spatial reuse link to the primary link does not exceed −74 dBm. Alternatively, the SRP may represent a value obtained after specific quantization/normalization of the tolerable interference level. For example, a power of white noise that occupies the same bandwidth as the sent signal is used as a normalization factor. In this case, the SRP may be regarded as a ratio of the interference level to the noise power, and a unit is dB. Alternatively, the SRP may represent a clear channel assessment (CCA) value and/or a CCA deviation value at a sending station that sends the signal carrying the SRP. Alternatively, the SRP may represent a maximum value of interference that can be tolerated by a transmission link on which a PPDU carrying the SRP is transmitted. Alternatively, the SRP may represent a transmit power at which the signal carrying the SRP is sent and/or a deviation value of the transmit power. In addition, the SRP may alternatively include two or a plurality of the foregoing parameters, namely, the SRP in this case is a combined parameter; or the SRP may be a parameter obtained after a specific mathematical transformation is performed on two or a plurality of the foregoing parameters; or the SRP may be a combined parameter including a parameter in any one of the foregoing forms and a margin (margin, an amount of surplus that plays a protection role); or the SRP may be a parameter obtained after a specific mathematical transformation is performed on a parameter in any one of the foregoing forms and a margin.

In a carrier sense phase, if a potential spatial reuse STA senses a data packet sent by the foregoing primary link or spatial reuse link, and a signal strength is less than an OBSS PD level, the STA can perform spatial reuse. The spatial reuse STA may properly adjust its transmit power based on an SRP carried in the data packet previously received over the primary link or the spatial reuse link, to perform concurrent link transmission without interfering with the primary link or the spatial reuse link.

Figure 2:
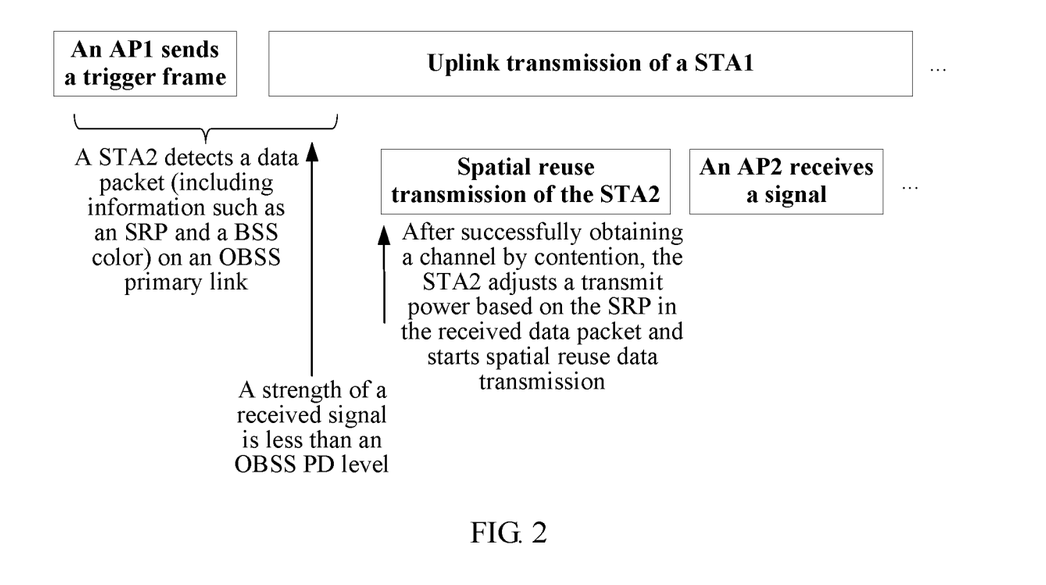
FIG. 2 is a schematic diagram of spatial reuse link transmission to which a data transmission method according to an embodiment of the present invention is applicable.

FIG. 2 is a schematic process diagram of an example in which the primary link is an uplink transmission link, and the spatial reuse link is an uplink transmission link. However, the primary link in the OBSS may be an uplink transmission link or a downlink transmission link, or may be a plurality of primary links or a plurality of spatial reuse links in a plurality of OBSSs; the spatial reuse link may be an uplink transmission link or a downlink transmission link, or may be a plurality of spatial reuse links in a plurality of OBSSs.

Figure 3:
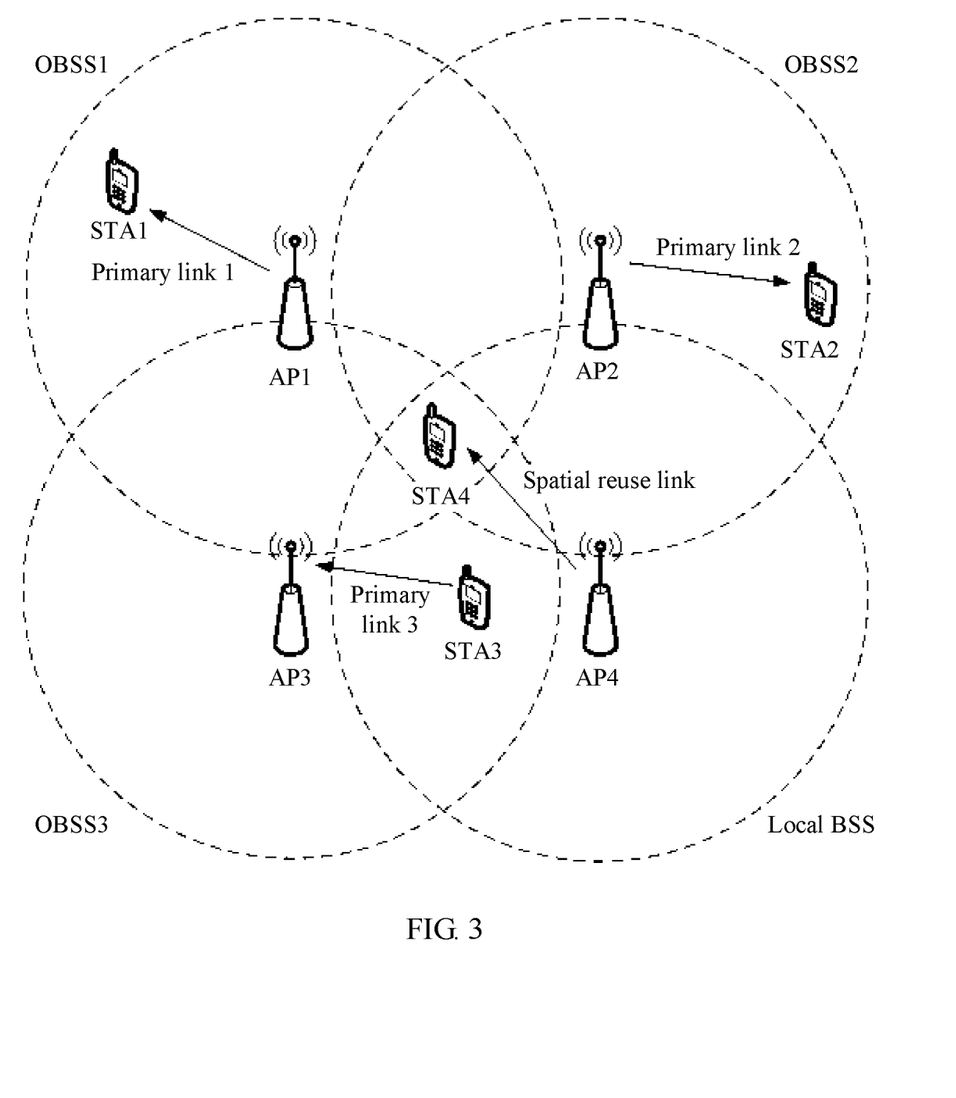
FIG. 3 is another schematic diagram of a communications system to which a data transmission method according to an embodiment of the present invention is applicable.

Further, this embodiment of the present invention lists a schematic diagram of a scenario in which a Wi-Fi wireless network includes a plurality of BSSs. An AP or a STA in each BSS can perform spatial reuse transmission. FIG. 3 shows a scenario example. FIG. 3 is a scenario in which there are three primary links in OBSSs and one spatial reuse link in a local BSS. A primary link in an OBSS1 is a downlink transmission link, a primary link in an OBSS2 is a downlink transmission link, a primary link in an OBSS3 is an uplink transmission link, and the spatial reuse link in the local BSS is a downlink transmission link. However, the present invention imposes no limitation on whether a primary link in an OBSS is an uplink transmission link or a downlink transmission link and whether a spatial reuse link is an uplink transmission link or a downlink transmission link. In other words, a primary link in each OBSS may be an uplink transmission link or a downlink transmission link. In addition, the links in the OBSS1, the OBSS2, and the OBSS3 may alternatively be spatial reuse links, and are not limited to being primary links. A spatial reuse link may be an uplink transmission link or a downlink transmission link.

The following further describes a data transmission method provided in this embodiment of the present invention. A communications node receives N SRPs, where N may optionally be a positive integer greater than or equal to 2; the communications node determines, based on the received N SRPs, that the communications node can perform spatial reuse link transmission; and the communications node transmits data by using a spatial reuse link. The communications node may be an AP or a STA.

The N SRPs are carried in N different PPDUs, or the N SRPs are carried in M different PPDUs, where M is a positive integer less than N. This is not described in detail in another method or apparatus embodiment.

The N different PPDUs are from N different OBSSs, or the M different PPDUs are from M different OBSSs. This is not described in detail in another method or apparatus embodiment.

One or more of the following determining methods may be used by the communications node to determine, based on the received N SRPs, that the communications node can perform spatial reuse link transmission:

Method 1:

The communications node determines, based on a current moment T, Q effective SRPs of the N SRPs, where Q is a positive integer less than or equal to N, and the effective SRPs are SRPs whose corresponding transmission opportunity (TXOP) transmission times include the current moment T. A destination receive station (including a STA or an AP) of a PPDU usually does not need to update its NAV counter based on duration information of the PPDU. However, another station (including a STA or an AP) located around a communications link needs to determine, based on a value of a Duration field in a received MAC frame, whether to update its NAV counter. When the received Duration value is greater than a current residual count value of the NAV counter of the another station, after transmission of the received PPDU ends, the another station sets an NAV count value to a count value indicated by the newly received Duration field. It should be noted that, in a current 802.11ax standard discussion, a signaling symbol of a packet header (also referred to as a preamble) of the PPDU includes a TXOP field, and the TXOP field is used to indicate a remaining transmission time in a current TXOP. A function of the TXOP field equates to placing a Duration field at a physical layer. In other words, the STA or the AP may instruct, by using the TXOP field in the physical packet header signaling of the sent PPDU and/or the duration information in a MAC frame header carried in the PPDU, the neighboring STA or AP to update the NAV counter of the neighboring STA or AP. It can be understood that, the TXOP field in the physical packet header signaling of the PPDU and the Duration field in the MAC frame header are collectively referred to as NAV Duration.

The communications node adjusts a transmit parameter to meet the Q effective SRPs, and the transmit parameter of the communications node is a function of the Q effective SRPs:

$$TX=f(SRP1, SRP2, \ldots, SRPQ)$$

If the transmit parameter meets a transmission requirement of the spatial reuse link, it is determined that the communications node can perform spatial reuse link transmission. During implementation, there may be a plurality of implementations of meeting the transmission requirement of the spatial reuse link, which are not listed one by one. The following is an example: If the transmit parameter (for example, a transmit power) is less than a minimum transmit power required for a receive end of the spatial reuse link to correctly receive a signal, it is considered that the transmit parameter does not meet the transmission requirement of the spatial reuse link. It may be specifically understood as follows: If a minimum receive power for receiving a signal required for the receive end of the spatial reuse link to correctly decode data sent by a transmit end of the spatial reuse link is Pr (in a unit of dB), and a path loss from the transmit end of the spatial reuse link to the receive end of the spatial reuse link is PL (in a unit of dB), to ensure that the receive end of the spatial reuse link correctly receives a signal, the minimum transmit power of the transmit end of the spatial reuse link is Pr+PL. If the transmit power P of the spatial reuse link is greater than or equal to Pr+PL, it indicates that P meets the transmission requirement of the spatial reuse link. The transmit parameter meeting the transmission requirement of the spatial reuse link is not limited to the foregoing implementation example. All implementations during product implementation should be considered to fall within the protection scope of the present invention.

Generally, TXOP transmission times corresponding to the N SRPs are N different TXOP transmission times, or TXOP transmission times corresponding to the N SRPs are O different TXOP transmission times, where O is a positive integer less than N. This is not described in detail in other method and apparatus embodiments.

Further, there may be at least the following two functions:

Function 1:

the function TX=ƒ(SRP1, SRP2, . . . , SRPQ) is specifically:

$$TX = P = \min\{P_1(SRP1), P_2(SRP2), \ldots, P_Q(SRPQ)\},$$

where $P_i(SRPi)$ is a maximum allowable value of a transmit power meeting $SRP_i$; and if the determined P meets the transmission requirement of the spatial reuse link, it is determined that the communications node can perform spatial reuse link transmission.

In this case, the SRP may represent a maximum value of interference that can be tolerated by a transmission link on which a PPDU carrying the SRP is transmitted.

Function 2:

the SRP is a CCA value of a spatial reuse link required by a transmission link on which a PPDU carrying the SRP is transmitted;

the communications node determines, according to the following formula, a CCA value for performing transmission by using the spatial reuse link:

$$CCA = \min\{SRP1, SRP2, \ldots, SRPQ\};$$

the communications node determines, according to the following formula, a maximum value of a transmit power for performing transmission by using the spatial reuse link:

$$P = P_0 - (CCA - CCA_0),$$

where $P_0$ is a maximum transmit power of the communications node during non-spatial reuse link transmission, and $CCA_0$ is a CCA value of the communications node during non-spatial reuse link transmission; and if the determined P meets the transmission requirement of the spatial reuse link, it is determined that the communications node can perform spatial reuse link transmission.

In an embodiment, $CCA_0 = -82$ dBm.

This method can greatly improve a transmission opportunity and a transmission rate of the spatial reuse link while ensuring primary link transmission, thereby increasing a capacity of an entire network.

Method 2:

The SRP includes an indication parameter used to indicate whether spatial reuse is allowed.

The determining, based on the received N SRPs, that the communications node can perform spatial reuse link transmission is specifically:

when indication parameters carried in the received N SRPs all indicate that spatial reuse is allowed, determining that the communications node can perform spatial reuse link transmission.

The indication parameter is indicated by one bit or a plurality of bits, or may be a special value represented by one or a plurality of bits.

This determining method is definite, and reduces interference possibly caused to a primary link. This method fully protects transmission of a primary link or a spatial reuse link corresponding to a received SRP, so that the primary link or the spatial reuse link corresponding to the received SRP may proactively determine whether spatial reuse is allowed. This balances a total capacity of a network and fairness.

Method 3:

The SRP includes a type parameter used to indicate a type of a link corresponding to a PPDU carrying the SRP, and the type includes at least one of a primary link and a spatial reuse link.

The determining, based on the received N SRPs, that the communications node can perform spatial reuse link transmission is specifically one of the following manners:

when type parameters included in the received N SRPs all indicate primary links, determining that the communications node can perform spatial reuse link transmission; and when type parameters included in the received N SRPs all indicate spatial reuse links, determining that the communications node can perform spatial reuse link transmission.

The type parameter is indicated by one or a plurality of bits.

This method avoids, to some extent, concurrent transmission performed when a spatial reuse link corresponding to a received SRP is a spatial reuse link of a primary link corresponding to the received SRP, reducing interference to the primary link to some extent.

Method 4:

The SRP includes an indication parameter used to indicate whether spatial reuse is allowed. The SRP further includes a type parameter used to indicate a type of a link corresponding to a PPDU carrying the SRP, and the type includes at least one of a primary link and a spatial reuse link.

The determining, based on the received N SRPs, that the communications node can perform spatial reuse link transmission is specifically one of the following manners:

when type parameters included in the received N SRPs all indicate primary links, and indication parameters carried in the received N SRPs all indicate that spatial reuse is allowed, determining that the communications node can perform spatial reuse link transmission; and when type parameters included in the received N SRPs all indicate spatial reuse links, and indication parameters carried in the received N SRPs all indicate that spatial reuse is allowed, determining that the communications node can perform spatial reuse link transmission.

This determining method is relatively strict, and can greatly reduce interference possibly caused to the primary link.

According to the foregoing embodiment, the communications node may determine whether to perform concurrent transmission by using the spatial reuse link in a relatively accurate manner, thereby greatly reducing the interference caused to the primary link or the spatial reuse link.

Figure 5:
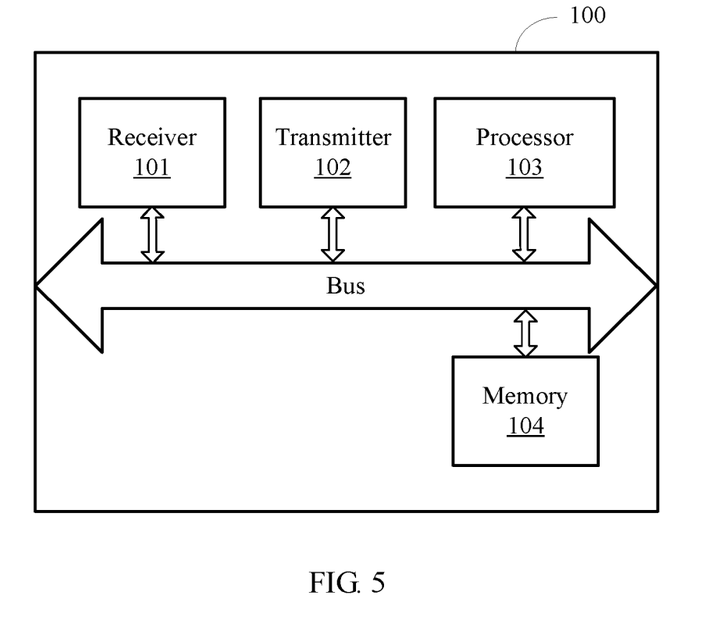
FIG. 5 is a schematic structural diagram of a data transmission communications node according to an embodiment of the present invention.

Referring to FIG. 5, an embodiment of the present invention further provides a communications node 100, for example, a STA or an AP, including a receiver 101 and a processor 103. Optionally, the communications node 100 includes a transmitter 102. Further optionally, the communications node 100 includes a memory 104. Further optionally, the communications node 100 may include a bus.

The receiver is configured to receive N SRPs.

The processor is configured to determine, based on the received N SRPs, that the communications node can perform spatial reuse link transmission, and the processor transmits data by using a spatial reuse link. In an implementation process, that the processor transmits data by using a spatial reuse link may be specifically that the processor schedules the receiver to receive data by using the spatial reuse link or schedules the transmitter to send data by using the spatial reuse link.

Optionally, N is a positive integer greater than or equal to 2.

Optionally, the SRP includes an indication parameter used to indicate whether spatial reuse is allowed.

Optionally, the processor is further configured to:

when indication parameters carried in the received N SRPs all indicate that spatial reuse is allowed, determine that the communications node can perform spatial reuse link transmission.

Optionally, the indication parameter occupies one bit.

Optionally, the SRP includes a type parameter used to indicate a type of a link corresponding to a PPDU carrying the SRP, and the type includes at least one of a primary link and a spatial reuse link.

Optionally, the processor is further configured to:

when type parameters included in the received N SRPs all indicate primary links, determine that the communications node can perform spatial reuse link transmission; or when type parameters included in the received N SRPs all indicate spatial reuse links, determine that the communications node can perform spatial reuse link transmission.

Optionally, the processor is further configured to:

determine, by the processor based on a current moment T, Q effective SRPs of the N SRPs, where Q is a positive integer less than or equal to N, and the effective SRPs are SRPs whose corresponding TXOP transmission times comprise the current moment T;

adjust, by the processor, a transmit parameter to meet the Q effective SRPs, where the transmit parameter is a function of the Q effective SRPs:

$$TX=f(SRP1, SRP2, \ldots, SRPQ); \text{ and}$$

if the transmit parameter meets a transmission requirement of the spatial reuse link, determine that the communications node can perform spatial reuse link transmission.

Optionally,

TXOP transmission times corresponding to the N SRPs are N different TXOP transmission times; or TXOP transmission times corresponding to the N SRPs are O different TXOP transmission times, where O is a positive integer less than N.

Optionally, the function $TX=f(SRP1, SRP2, \ldots, SRPQ)$ is specifically:

$$TX=P=\min\{P_1(SRP1), P_2(SRP2), \ldots, P_Q(SRPQ)\},$$

where $P_i(SRPi)$ is a maximum allowable value of a transmit power meeting SRPi; and if the determined P meets the transmission requirement of the spatial reuse link, it is determined that the communications node can perform spatial reuse link transmission.

Optionally, the SRP is a CCA value of a spatial reuse link required by a transmission link on which a PPDU carrying the SRP is transmitted;

the processor is further configured to determine, according to the following formula, a CCA value for performing transmission by using the spatial reuse link:

$$CCA=\min\{SRP1, SRP2, \ldots, SRPQ\};$$

the processor determines, according to the following formula, a maximum value of a transmit power for performing transmission by using the spatial reuse link:

$$P=P_0-(CCA-CCA_0),$$

where $P_0$ is a maximum transmit power of the communications node during non-spatial reuse link transmission, and $CCA_0$ is a CCA value of the communications node during non-spatial reuse link transmission; and if the determined P meets the transmission requirement of the spatial reuse link, it is determined that the communications node can perform spatial reuse link transmission.

Optionally, the N SRPs are carried in N different PPDUs; or the N SRPs are carried in M different PPDUs, where M is a positive integer less than N.

Optionally, the N different PPDUs are from N different OBSSs; or the M different PPDUs are from M different OBSSs.

The communications node is an access point AP or a station STA.

The description of the foregoing method embodiment may be applied to this communications node embodiment, and details are not repeated herein.

Figure 4:
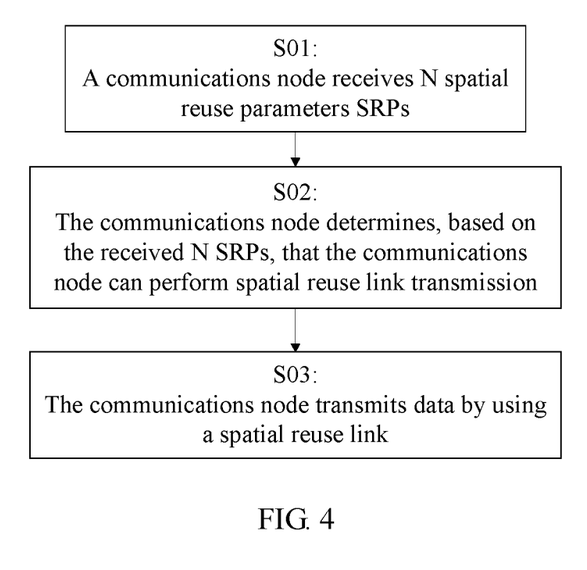
FIG. 4 is a schematic flowchart of a data transmission method according to an embodiment of the present invention.

In this embodiment of the present invention, the processor 103 may be configured to perform the steps S02 and S03 of method showed by FIG. 4, and the memory 104 is configured to store a program and data required for the processor 103 to perform the foregoing steps.

In the foregoing embodiments, the symbol "/" indicates an "or" relationship, and A and/or B indicate/indicates three cases: A, B, or A and B.

In this embodiment of the present invention, the processor may alternatively be referred to as a CPU. The memory may include a read-only memory and a random access memory, and provide an instruction and data to the processor. A part of the memory may further include a non-volatile random access memory (NVRAM). In specific application, a data transmission station may be embedded into, or may be, a standard Ethernet communications station such as a personal computer. Various modules of the data transmission station are coupled to each other by using a bus system. The bus system includes not only a data bus but also a power bus, a control bus, and a status signal bus.

The processor may implement or perform steps and logical block diagrams disclosed in the method embodiments of the present invention. A general purpose processor may be a microprocessor, or the processor may be any conventional processor, decoder, or the like. Steps of the method disclosed with reference to the embodiments of the present invention may be directly performed by a hardware processor, or may be performed by using a combination of hardware in a decoding processor and a software module. The software module may be located in a mature storage medium in the art, such as a random access memory, a flash memory, a read-only memory, a programmable read-only memory, an electrically erasable programmable memory, or a register. The storage medium is located in the memory, and a decoding unit or a processing unit reads information from the memory and completes the steps in the foregoing method in combination with hardware in the decoding unit or the processing unit.

It should be understood that in the embodiments of the present invention, the processor may be a central processing unit (CPU), or the processor may be another general purpose processor, a digital signal processor (DSP), an application-specific integrated circuit (ASIC), a field programmable gate array (FPGA), or another programmable logic device, discrete gate or transistor logic device, discrete hardware component, or the like. The general purpose processor may be a microprocessor, or the processor may be any conventional processor or the like.

In an implementation process, steps in the foregoing method may be completed by using a hardware integrated logic circuit in the processor, or by using instructions in a form of software. The steps of the method disclosed with reference to the embodiments of the present invention may be directly performed by a hardware processor, or may be performed by using a combination of hardware in the processor and a software module. The software module may be located in a mature storage medium in the art, such as a random access memory, a flash memory, a read-only memory, a programmable read-only memory, an electrically erasable programmable memory, or a register. The storage medium is located in the memory, and the processor reads information from the memory and completes the steps in the foregoing method in combination with the hardware in the processor. To avoid repetition, details are not described herein again.

It should be understood that sequence numbers of the foregoing processes do not mean execution sequences in various embodiments of the present invention. The execution sequences of the processes should be determined based on functions and internal logic of the processes, and should not be construed as any limitation on the implementation processes of the embodiments of the present invention.

A person of ordinary skill in the art understands that, the units and algorithm steps in the examples described with reference to the embodiments disclosed in this specification may be implemented by electronic hardware or a combination of computer software and electronic hardware. Whether the functions are executed by hardware or software depends on particular applications and design constraint conditions of the technical solutions. A person skilled in the art may use different methods to implement the described functions for each particular application, but it should not be considered that the implementation goes beyond the scope of the present invention.

A person skilled in the art understands that, for the purpose of convenient and brief description, for a detailed working process of the foregoing system, apparatus, and unit, reference may be made to a corresponding process in the foregoing method embodiments, and details are not repeated herein.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on a plurality of network units. Some or all of the units may be selected based on actual needs to achieve the objectives of the solutions of the embodiments.

In addition, functional units in the embodiments of the present invention may be integrated into one processing unit, or each of the units may exist alone physically, or two or more units may be integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The computer software product is stored in a storage medium and includes several instructions for instructing a computer station (which may be a personal computer, a server, a network station, or the like) to perform all or some of the steps of the method described in the embodiments of the present invention. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A data transmission method, comprising,
   receiving, by a communications node, N spatial reuse parameters (SRPs), N being a positive integer;
   determining, by the communications node based on the received N SRPs, that the communications node is capable of performing spatial reuse link transmission; and
   transmitting, by the communications node, data by using a spatial reuse link,
   wherein
   the determining, by the communications node based on the received N SRPs, that the communications node is capable of performing spatial reuse link transmission comprises:
   determining, by the communications node based on a current moment T, Q effective SRPs of the N SRPs, wherein Q is a positive integer less than or equal to N, and the effective SRPs are SRPs whose corresponding transmission opportunity (TXOP) transmission times comprise the current moment T;
   adjusting, by the communications node, a transmit parameter to meet the Q effective SRPs, wherein the transmit parameter of the communications node is a function of the Q effective SRPs:

$TX=f(SRP1, SRP2, \ldots, SRPQ)$; and if the transmit parameter meets a transmission requirement of the spatial reuse link, determining that the communications node is capable of performing spatial reuse link transmission.

2. The method according to claim 1, wherein
   TXOP transmission times corresponding to the N SRPs are N different TXOP transmission times; or
   TXOP transmission times corresponding to the N SRPs are O different TXOP transmission times, wherein O is a positive integer less than N.

3. The method according to claim 1, wherein
the function TX=$f$(SRP1, SRP2, ..., SRPQ) is specifically:

$$TX=P=\min\{P_1(\text{SRP1}),P_2(\text{SRP2}),\ldots,P_Q(\text{SRP}Q)\},$$

wherein $P_i$(SRPi) is a maximum allowable value of a transmit power meeting SRPi; and
if the determined P meets the transmission requirement of the spatial reuse link, it is determined that the communications node is capable of performing spatial reuse link transmission.

4. The method according to claim 1, wherein
at least one of the SRPs comprises a clear channel assessment (CCA) value of a spatial reuse link required by a transmission link on which a physical layer protocol data unit (PPDU) carrying the SRP is transmitted;
the communications node determines, according to the following formula, a CCA value for performing transmission by using the spatial reuse link:

$$\text{CCA}=\min\{\text{SRP1},\text{SRP2},\ldots,\text{SRP}Q\};$$

the communications node determines, according to the following formula, a maximum value of a transmit power for performing transmission by using the spatial reuse link:

$$P=P_0-(\text{CCA}-\text{CCM}_0),$$

wherein $P_0$ is a maximum transmit power of the communications node during non-spatial reuse link transmission, and $\text{CCA}_0$ is a CCA value of the communications node during non-spatial reuse link transmission; and
if the determined P meets the transmission requirement of the spatial reuse link, it is determined that the communications node is capable of performing spatial reuse link transmission.

5. A communications node, comprising:
a receiver, configured to receive N spatial reuse parameters (SRPs), N being a positive integer; and
a processor, configured to determine, based on the received N SRPs, that the communications node is capable of performing spatial reuse link transmission, wherein the communications node transmits data by using a spatial reuse link,
and wherein the processor is further configured to:
determine, based on a current moment T, Q effective SRPs of the N SRPs, wherein Q is a positive integer less than or equal to N, and the effective SRPs are SRPs whose corresponding transmission opportunity (TXOP) transmission times comprise the current moment T;
adjust a transmit parameter to meet the Q effective SRPs, wherein the transmit parameter is a function of the Q effective SRPs:

$$TX=f(\text{SRP1},\text{SRP2},\ldots,\text{SRP}Q); \text{ and}$$

if the transmit parameter meets a transmission requirement of the spatial reuse link, determine that the communications node is capable of performing spatial reuse link transmission.

6. The communications node according to claim 5, wherein
TXOP transmission times corresponding to the N SRPs are N different TXOP transmission times; or
TXOP transmission times corresponding to the N SRPs are O different TXOP transmission times, wherein O is a positive integer less than N.

7. The communications node according to claim 5, wherein
the function TX=$f$(SRP1, SRP2, ..., SRPQ) is:

$$TX=P=\min\{P_1(\text{SRP1}),P_2(\text{SRP2}),\ldots,P_Q(\text{SRP}Q)\},$$

wherein $P_i$(SRPi) is a maximum allowable value of a transmit power meeting SRPi; and
if the determined P meets the transmission requirement of the spatial reuse link, it is determined that the communications node is capable of performing spatial reuse link transmission.

8. The communications node according to claim 5, wherein
at least one of the SRPs comprises a clear channel assessment (CCA) value of a spatial reuse link required by a transmission link on which a physical layer protocol data unit (PPDU) carrying the SRP is transmitted;
the processor is further configured to determine, according to the following formula, a CCA value for performing transmission by using the spatial reuse link:

$$\text{CCA}=\min\{\text{SRP1},\text{SRP2},\ldots,\text{SRP}Q\};$$

the processor determines, according to the following formula, a maximum value of a transmit power for performing transmission by using the spatial reuse link:

$$P=P_0-(\text{CCA}-\text{CCA}_0),$$

wherein $P_0$ is a maximum transmit power of the communications node during non-spatial reuse link transmission, and $\text{CCA}_0$ is a CCA value of the communications node during non-spatial reuse link transmission; and
if the determined P meets the transmission requirement of the spatial reuse link, it is determined that the communications node is capable of performing spatial reuse link transmission.

* * * * *